No. 646,788. Patented Apr. 3, 1900.
R. W. BALCH & J. J. MERRILL.
MAGAZINE CAMERA.
(Application filed Nov. 14, 1899.)
(No Model.) 2 Sheets—Sheet 1.

WITNESSES:
Donn Twitchell
John Lotka

INVENTORS
R. W. Balch
John J. Merrill
BY
ATTORNEYS

No. 646,788. Patented Apr. 3, 1900.
R. W. BALCH & J. J. MERRILL.
MAGAZINE CAMERA.
(Application filed Nov. 14, 1899.)
(No Model.) 2 Sheets—Sheet 2.

WITNESSES:
Donn Twitchell
John Lotka

INVENTORS
R. W. Balch
John J. Merrill
BY
ATTORNEYS

THE NORRIS PETERS CO., PHOTO-LITHO., WASHINGTON, D. C.

UNITED STATES PATENT OFFICE.

RELLA W. BALCH AND JOHN J. MERRILL, OF NEILLSVILLE, WISCONSIN.

MAGAZINE-CAMERA.

SPECIFICATION forming part of Letters Patent No. 646,788, dated April 3, 1900.

Application filed November 14, 1899. Serial No. 736,945. (No model.)

*To all whom it may concern:*

Be it known that we, RELLA W. BALCH and JOHN J. MERRILL, citizens of the United States, and residents of Neillsville, in the county of Clark and State of Wisconsin, have invented a new and Improved Magazine-Camera, of which the following is a full, clear, and exact description.

Our invention relates to magazine-cameras, and has for its object to provide a camera in which the magazine may be readily removed, together with its plate-changing device, to provide an improved plate-changing device, and, in general, to so construct the camera that its working will be simple and reliable.

The invention will be fully described hereinafter and the features of novelty pointed out in the appended claims.

Reference is to be had to the accompanying drawings, forming a part of this specification, in which similar characters of reference indicate corresponding parts in all the figures.

Figure 1:
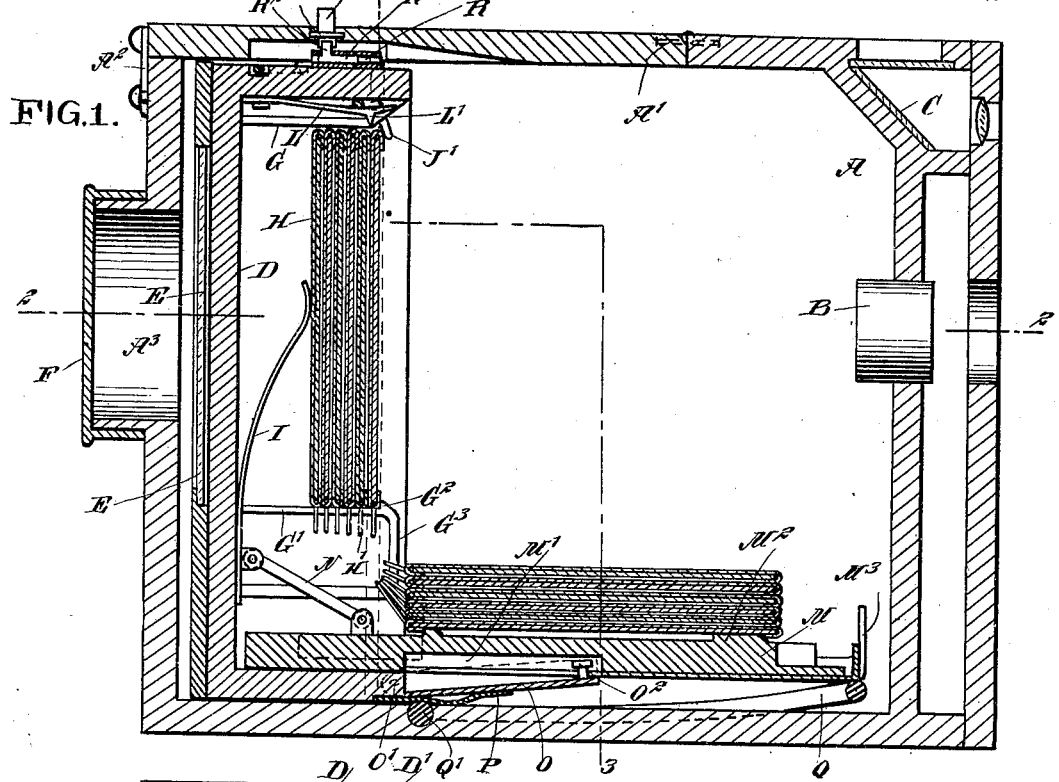
Figure 2:
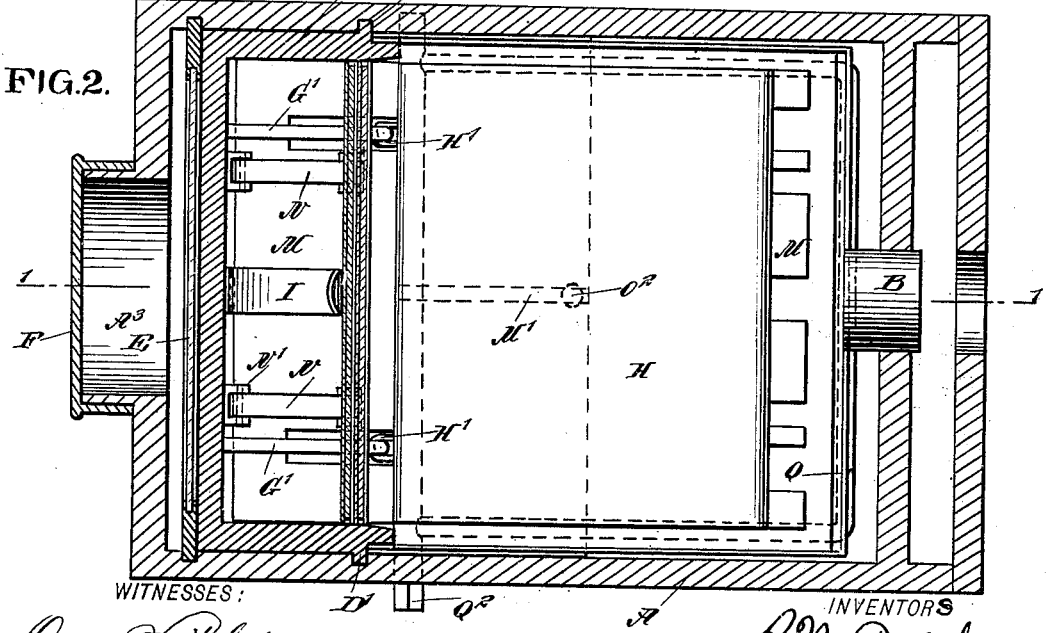
Figure 3:
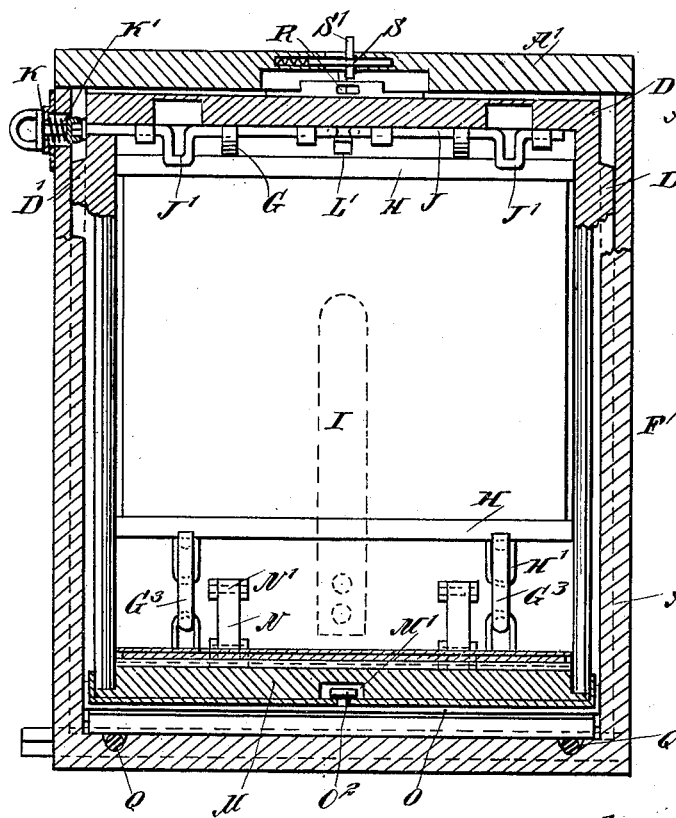
Figure 4:
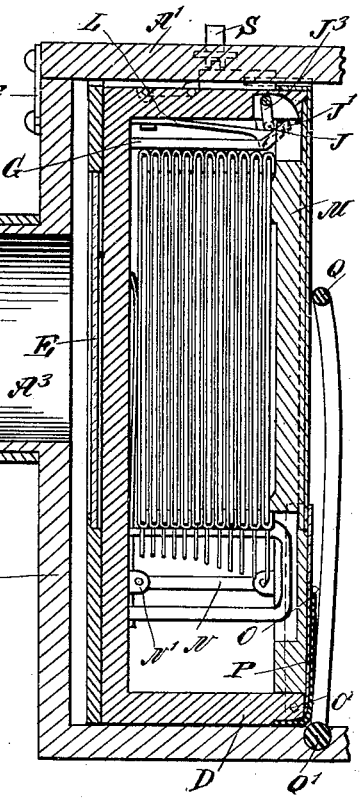
Figure 5:
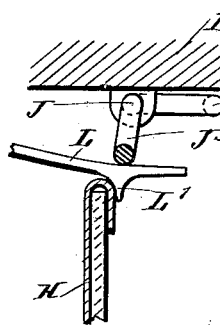
Figure 6:
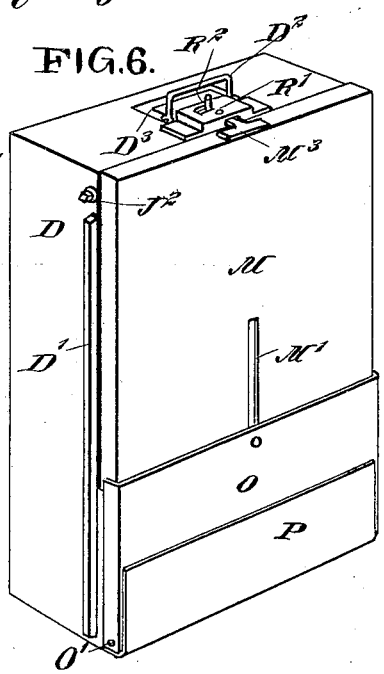
Figure 7:
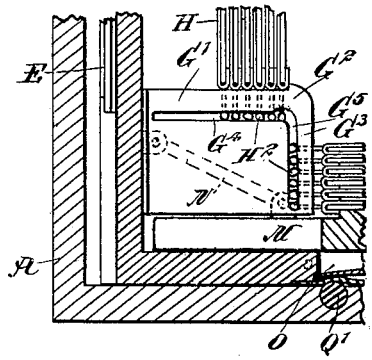

Figure 1 is a central sectional elevation of the camera on the line 1 1 of Fig. 2. Fig. 2 is a sectional plan on the line 2 2 of Fig. 1. Fig. 3 is a cross-sectional elevation on the line 3 3 of Fig. 1. Fig. 4 is a central section of the rear end of the camera substantially on the same line as Fig. 1, but showing the magazine closed. Fig. 5 is a detail of the mechanism for holding the plates of the magazine. Fig. 6 is a perspective view of the magazine-supporter, and Fig. 7 is a sectional elevation showing another way of guiding the plates in the magazine.

The camera consists of a suitable box A, having an objective B, with its ordinary appurtenances, and a finder C. The top of the camera has a hinged lid A', which may be held down by a suitable fastening device $A^2$. The side walls of the camera have grooves for the reception of ribs D' of the magazine D. The magazine may be removed when the lid A' is open by simply pulling it out through the top, a handle $D^2$ being provided to facilitate this manipulation. This handle may be laid down in a suitable recess $D^3$ of the magazine.

We also provide a ground glass E, which when the magazine is in use is inserted in the rearmost grooves of the side walls of the camera, as shown in Fig. 2; but when the magazine is removed the ground glass may be inserted in the front grooves, so that it will be in the focal plane. The back of the camera has an opening $A^3$, which may be closed by a cap F, said opening serving for the observation of the image upon the ground glass.

The magazine is a light-proof box closed at all sides except the front. It is provided with upper guides G, against which are adapted to rest the plate-holders H, and lower guides G', forming supports for the said plate-holders, which are pressed forward by a spring I. A stop $G^2$ at the forward end of the lower guides G' limits the forward movement of the foremost plate-holder. The upper end of the foremost plate-holder is during exposure held stationary by crank members J' upon a transverse shaft J, journaled within the magazine. This shaft projects beyond the magazine at one end and is there provided with a square end $J^2$, adapted to be engaged by a similar section of a key K, mounted to rotate in one of the side walls of the camera and also capable of sliding movement therein, so that the key may be withdrawn from engagement with the shaft end $J^2$, so as to allow the magazine to be withdrawn. A spring K' normally holds the key K in its inner position. The shaft J is normally pressed, so as to keep the plate-holders in position, by means of a spring L, which engages a central crank-arm $J^3$ upon said shaft, it being understood that the spring L is stronger than the spring I. On its lower surface the spring L has a projection L', adapted to fit between the two foremost plate-holders when said spring is lowered, as more fully referred to hereinafter. The lower guide G' is continued downwardly at its forward end, as indicated at $G^3$.

The front end of the magazine is adapted to be closed by a plate M, which is pivotally connected with links N, fulcrumed at N' upon the back wall of the magazine. The plate M is further guided in its movement by means of an arm O, pivoted at O' to the bottom of the magazine and having a headed pin or stud $O^2$, which slides within a central groove M' in the plate M. To cover the joint of the pivot-arm O with the bottom of the magazine, we preferably provide a loose piece or flap P of flexible material, such as leather. The plate M is provided upon its inner face with projections $M^2$, adapted for support of the exposed plates and their holders when the same have moved down the vertical members $G^3$ of the lower guides $G'$, as shown in Fig. 1, so as to prevent contact of the lowermost plate with the surface of the front plate M.

To effect the upward movement of the plate M, we provide a bail Q, pivoted at $Q'$ and provided with a square end $Q^2$ to enable it to be turned by a suitable key, or a handle may be secured to the protruding end of said bail. When the bail is released, the front end of the magazine will drop down by its own weight. The plate M at its forward or upper edge is provided with a hook $M^3$, which is adapted for locking engagement with a hook R, secured to the top of the magazine and pivoted about an axis $R'$. By the engagement of these two hooks the front plate M is locked to the top of the magazine, so that the magazine is perfectly light-tight and may be removed from the camera with no danger to the exposed plates. To release the hooks R and $M^3$, so as to allow the front plate M to drop, the lid of the camera $A'$ contains a laterally-movable spring-pressed slide S, with a projecting button $S'$, which is adapted to engage the projecting end arm $R^2$ of the hook R, so that the said hook may be swung upon its axis and out of engagement with the hook $M^3$.

The manner of using the camera is as follows: Fig. 1 shows the plate in position for exposure or immediately thereafter. In order to then cause the foremost or exposed plate to drop upon the front plate M, the operator turns the key K, so as to cause the central crank $J^3$ of the shaft J to press the spring L downward and to bring the projection $L'$ thereof in front of the plate-holder which is next to the foremost plate-holder, (see Fig. 5,) thus allowing only the foremost plate-holder to move. The wedge shape of the projection $L'$ at the same time starts the plate-holder on its forward movement, which is at first a pivotal movement about the stop $G^2$ and then a sliding movement along the guide portion $G^3$, each plate-holder at its lower end having a ring or link $H'$, which travels along the said guide. It will be understood that the same turning movement of the shaft J has brought the members $J'$ out of the path of the foremost plate-holder, so that the same is free to drop. When this has been effected, the shaft J is turned to assume its former position, and as soon as the projection $L'$ releases that plate-holder which is now the foremost one said plate-holder will travel forward until it is arrested by the crank portion $J'$. When, however, it is desired to close the magazine, as shown in Fig. 4, it is obviously necessary that neither the crank members $J'$ nor the crank member $J^3$ should be in the way of the plate-holders. For this purpose the shaft J is turned until the crank members $J'$ extend about vertically upward therefrom and the crank member $J^3$ about horizontally forward, which allows the spring L to move upward out of the path of the plate-holders. This of course is done only after the front plate M has been turned approximately into its vertical position, so that there may be no danger of the spring L forcing the plate-holders out of the magazine.

In Fig. 7 we have illustrated a different way of guiding the plate-holders at their lower ends. In this case the links $H'$ are omitted, and in their lieu we provide wires $H^2$, rigidly connected with the plate-holders and projecting laterally into guide-grooves $G^4$, which are made wider at $G^5$ to allow for a slight lifting movement, which is necessary to bring the plate-holder over the projection or stop $G^2$ at the front end of the guide $G'$.

It will be seen that the operation of the improved camera is exceedingly simple, as a simple movement of the shaft J effects the changing of the plates, and it will be further seen that the magazine, with the plate-changing mechanism, may be removed in daylight and that by the use of reserve magazines any desired number of exposures may be made without the necessity of a dark room.

Having thus described our invention, we claim as new and desire to secure by Letters Patent—

1. A camera provided with a casing having operating means on the outside thereof, a magazine removable from the casing, a plate-changing device connected with the magazine and removable therewith from the casing, said device having a part arranged to engage the operating means on the casing when the magazine is connected with the casing.

2. A camera provided with a removable magazine having a movable front plate adapted to be swung forwardly and downwardly to form a support for the exposed plates, and to be folded upward against the body of the magazine to form therewith a light-tight box and means for fastening the front plate to the body of the magazine, so that both, forming a light-tight box, may be removed together from the camera.

3. The combination of the magazine-body open at its front end, means secured directly to said magazine-body for feeding, holding and releasing plate-holders, and the swinging front plate adapted for locking engagement with the body and constructed to receive and support the exposed plates after their release from the magazine-body.

4. The combination of the magazine-body open at its front end, means for feeding, holding and releasing plate-holders in said magazine-body, and the swinging front plate adapted for locking engagement with the body and constructed to receive and support the exposed plates after their release from the magazine-body, links the ends of which are pivotally connected with said plate and with the magazine-body and an arm pivoted to the said body respectively, and having a sliding engagement with the front plate.

5. The combination of a magazine-body open at its front end, means for feeding, holding and releasing plate-holders in said magazine-body, and the swinging front plate adapted for locking engagement with the body and constructed to receive and support the exposed plates after their release from the magazine-body, links the ends of which are pivotally connected with said plate and with the magazine-body, respectively, an arm pivoted to the said body and having a sliding engagement with the front plate, and a flap of flexible material to cover the joint at the pivot of said arm.

6. The combination of the magazine having guides, plate-holders mounted to slide on said guides and provided with retaining links or loops secured to the plate-holders at the bottom and encircling the said guides, a plate-changing device, and a support for the exposed plates.

7. The combination of the magazine having guides, plate-holders mounted to slide on said guides and provided with transverse wires or projections having sliding movement below said guides, a plate-changing device, and a support for the exposed plates.

8. The combination of the magazine having guides for the plate-holders, a transverse shaft located at the upper end of the magazine and provided with crank members for normally holding the foremost plate-holder, a spring normally clearing the plate-holders, and another crank on the said shaft adapted to force said spring down between the two foremost plate-holders at the time the front-plate holder is released.

9. A camera provided with a casing having operating means on the outside thereof, a magazine mounted to slide into and out of the casing and separable therefrom, a plate-changing device connected with the magazine and removable therewith from the casing, said device having a part arranged to engage the operating means on the casing when the magazine is in its inner position.

In testimony whereof we have signed our names to this specification in the presence of two subscribing witnesses.

RELLA W. BALCH.
JOHN J. MERRILL.

Witnesses:
J. F. SCHUSTER,
FRANK HEMP.